United States Patent
Nishijima et al.

[11] Patent Number: 5,874,946
[45] Date of Patent: Feb. 23, 1999

[54] IMAGE CONTROL DEVICE AND DATA INPUT DEVICE TO BE USED THEREFOR

[75] Inventors: Akio Nishijima; Seiichi Suga; Tooru Yamagami, all of Fukushima-ken, Japan

[73] Assignee: Alps Electric Co., Ltd., Tokyo, Japan

[21] Appl. No.: 808,448

[22] Filed: Feb. 28, 1997

[30] Foreign Application Priority Data

Mar. 5, 1996 [JP] Japan .................................. 8-047468

[51] Int. Cl.⁶ ....................................................... G09G 5/00
[52] U.S. Cl. ........................... 345/169; 345/158; 345/168
[58] Field of Search .................................. 345/156, 157, 345/158, 168, 169, 173

[56] References Cited

U.S. PATENT DOCUMENTS

| | | | |
|---|---|---|---|
| 5,049,863 | 9/1991 | Oka | 345/168 |
| 5,448,263 | 9/1995 | Marin | 345/173 |
| 5,489,923 | 2/1996 | Marshall et al. | 345/158 |

*Primary Examiner*—Matthew Luu
*Attorney, Agent, or Firm*—Brinks Hofer Gilson & Lione

[57] ABSTRACT

Disclosed are an image control device and a data input device, which comprises an apparatus housing section for removably housing a portable coordinate input apparatus having a control face and a light emitting element, a key control section having many keys, and a light receiving element; in the apparatus housing section are disposed a movable mounting base which is movable between an upper limit position and a lower limit position, so that when the portable coordinate input apparatus is inserted and housed in the apparatus housing section, the movable mounting base is engaged and held in the lower limit position, where the entire upper surface of the portable coordinate input apparatus is nearly flush with the control face of the key control section; and on the other hand, when the portable coordinate input apparatus is removed from the apparatus housing section, the movable mounting base moves up to the upper limit position and a part of the lower surface of the portable coordinate input apparatus becomes nearly flush with the control face of the key control section.

7 Claims, 6 Drawing Sheets

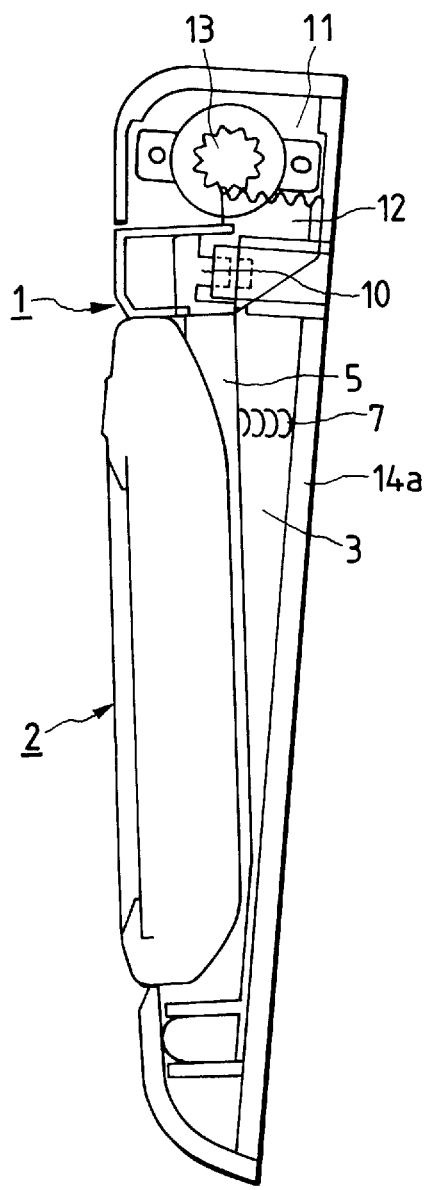
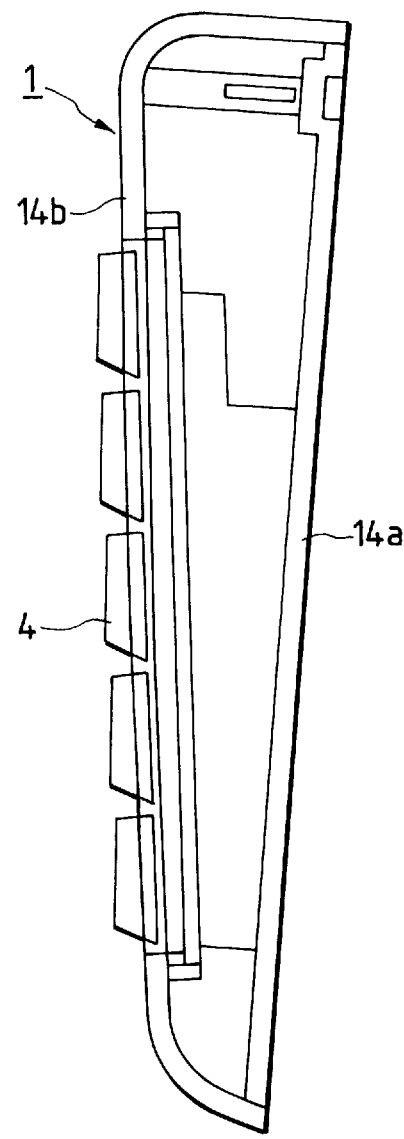

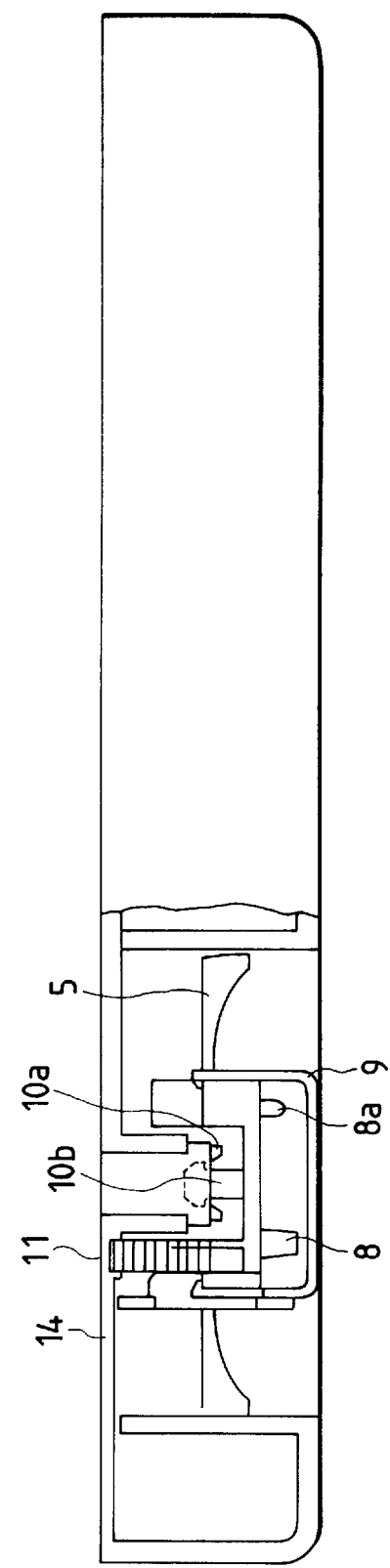

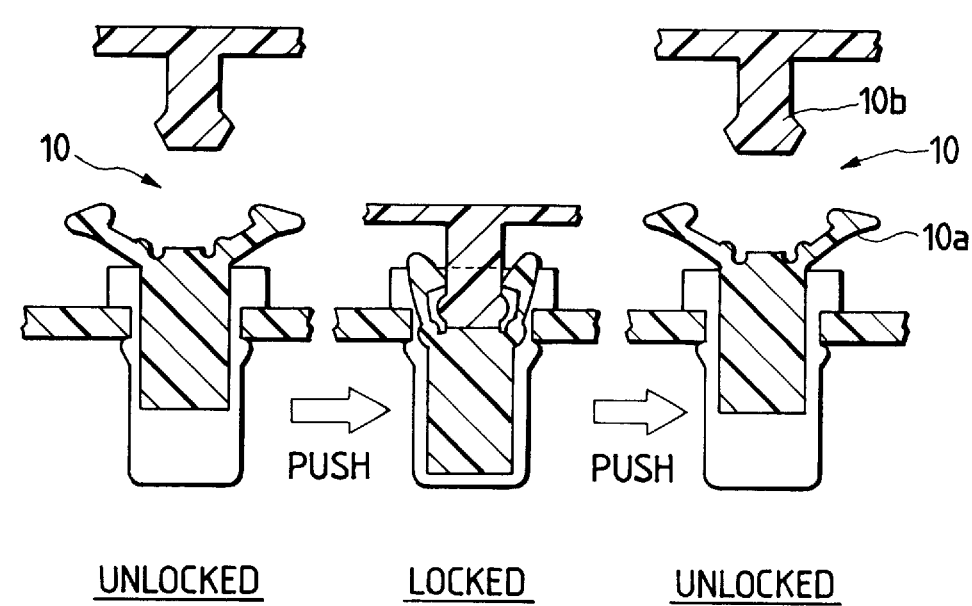

IMAGE CONTROL DEVICE AND DATA INPUT DEVICE TO BE USED THEREFOR

BACKGROUND OF THE INVENTION

The present invention relates to an image control device and a data input device to be used therefor and, more particularly, to a data input device so adapted that a portable coordinate input apparatus can be inserted into and removed from the device, and that coordinate data can be inputted by operating the portable coordinate input apparatus without regard to the state of the portable coordinate input apparatus, that is, an inserted state or a removed state.

As a coordinate input apparatus (data input device) used in connection with an image display device of a personal computer for example, for moving a cursor on the screen of the image display device, a mouse and a track ball have been known.

The mouse or track ball is directly connected to the image display device of the personal computer, to change over details of data displayed on the screen of the image display device and to select various kinds of functions, for instance a spotlight function, a zooming function, and a marker or line function.

As a recent tendency, there has been practiced a so-called presentation (using a large data) in which a speaker explains, to many people, information magnified and projected onto the large data on the basis of the information displayed on the image display device of the personal computer. In such a presentation, the track ball incorporated in a keyboard of the image display device of the personal computer is operated or the mouse directly connected to the image display device of the personal computer is manipulated to move the cursor on the data to change a certain portion of information displayed on the same data or to change over the information to another.

In the above-described known presentation, two persons are generally needed: one for moving the cursor on the display section of the image display device of the personal computer, that is, an operator who manipulates the mouse or the track ball connected to the image display device, and a speaker who explains images displayed on the data. Therefore, if these two persons fail to work in full cooperation with each other, there will occur such a problem that, against the speaker's will, the image displayed on the data makes no change at the preset time of image changeover; the image tends to change at other than the preset time of image change; the cursor position in the image on the screen tends to move out of a proper position; and that it will become necessary to correct the image on the screen to proper one and also to move the cursor to a proper position every time a change is made.

In the above-described known presentation, it is necessary to pay much attention during operation, and also to use much time for operation to display an image of proper information.

SUMMARY OF THE INVENTION

To solve the above-described problem, the present invention has an object to provide an image control device and a data input device to be used therefor which have superior controllability and are able to immediately and accurately display an image required.

According to a first aspect of the invention, there is provided an image control device, comprising: a portable coordinate input apparatus having a control face and a light emitting element and capable of independent remote operation; a data input device having a light receiving element and including an apparatus housing section for removably housing the portable coordinate input apparatus and a key control section provided with key switches; and a computer apparatus for controlling an image of a projector by data supplied from the data input device; the light receiving element receiving coordinate data and switch data from the portable coordinate input device and sending the data to the data input apparatus either during remote operation or when the portable coordinate input device is housed in the apparatus housing section.

According to a second aspect of the invention, there is provided a data input device, comprising: an apparatus housing section for removably housing a portable coordinate input apparatus having a control face and a light emitting element, a key control section having many keys, and a light receiving element; in the apparatus housing section are disposed a movable mounting base which is movable between an upper limit position and a lower limit position, so that when the portable coordinate input apparatus is inserted and housed in the apparatus housing section, the movable mounting base is held in the lower limit position, where the entire upper surface of the portable coordinate input apparatus is nearly flush with the control face of the key control section; and on the other hand, when the portable coordinate input apparatus is removed from the apparatus housing section, the movable mounting base moves up to the upper limit position and a part of the lower surface of the portable coordinate input apparatus becomes nearly flush with the control face of the key control section.

As one modification of the present invention, the upward movement of the portable mounting base up to the upper limit position is accomplished by the elastic force of an elastic member, and also the downward movement of the portable mounting base to the lower limit position in which the portable mounting base is held is accomplished by engaging with a locking member against the elastic force of the elastic member.

As another modification of the present invention, a rack-and-pinion mechanism is mounted on the short edge portion on one side of the portable mounting base and a rotating shaft is mounted on the short edge portion on the other side, so that when the movable mounting base is moved to the upper limit position and to the lower limit position, only the short edge portion on one side is moved by the rack-and-pinion mechanism on the axis of the short edge portion on the other side.

As another modification of the present invention, mounted is the light emitting element for generating an optical signal for coordinate (positional) data and switch data to the front face side. On the data input device side, the light receiving element for receiving the optical signal is disposed close to the side wall section of the apparatus housing section facing the light emitting element when the portable coordinate input apparatus is inserted and housed in the apparatus housing section.

As another modification of the present invention, the portable coordinate input apparatus is comprised of a capacitance variable type detecting face (control face) which is operated by fingers.

As another modification of the present invention, the portable coordinate input apparatus has a first switch group operating to changeover the data, and a plurality of second switch groups for selecting various kinds of functions, as spotlight function, zooming function, and marker and line functions.

Accordingly, when the control face (detection face) or various switches mounted on the portable coordinate input apparatus are operated, the coordinate (position) data and switch data obtained by the operation of these control devices are transmitted in a form of optical signal from the light emitting element on the portable coordinate input apparatus side to the light receiving element on the data input device side regardless of the state of the portable coordinate input apparatus, that is, whether the portable coordinate input apparatus is housed in, or off, the apparatus housing section. When the data input device receives the optical signal, the coordinate (position) data or the switch data in the optical signal is supplied to the image display device, thereby moving the cursor on the screen of the display section of the image display device or changing the data.

Furthermore, when a presentation is performed by the use of the data input device, the speaker holding the portable coordinate input apparatus that has been removed from the apparatus housing section explains while operating the portable coordinate input apparatus. Also the speaker, when having the data input device to hand, can explain while operating the portable coordinate input apparatus as unremoved from the apparatus housing section. It is, therefore, possible to smoothly operate the equipment while immediately and accurately displaying necessary information on the data and also to immediately and accurately move the cursor to a display point required.

Furthermore, when the portable coordinate input apparatus is inserted into the apparatus housing section, the upper surface of the portable coordinate input apparatus becomes flush with the control surface of the key control section, and therefore the speaker can operate the control face (detecting face) and various kinds of switch groups of the portable coordinate input apparatus just like operating the key control section.

BRIEF DESCRIPTION OF THE DRAWINGS

The present invention may be further understood by reference to the drawings, wherein:

FIGS. 2A and 2B are sectional views taken along lines 2A—2A and 2B—2B, respectively, of the data input device shown in FIG. 1;

FIG. 3 is a partly sectional view taken along line 3—3 in the data input device shown in FIG. 1;

FIG. 4 is a sectional view showing one example of constitution of an engaging and holding member for holding, in the lower limit position, a movable mounting base used in the data input device shown in FIGS. 1 to 3;

DESCRIPTION OF THE PREFERRED EMBODIMENTS

Hereinafter the preferred embodiments of the present invention will be described with reference to the accompanying drawings.

Figure 1:
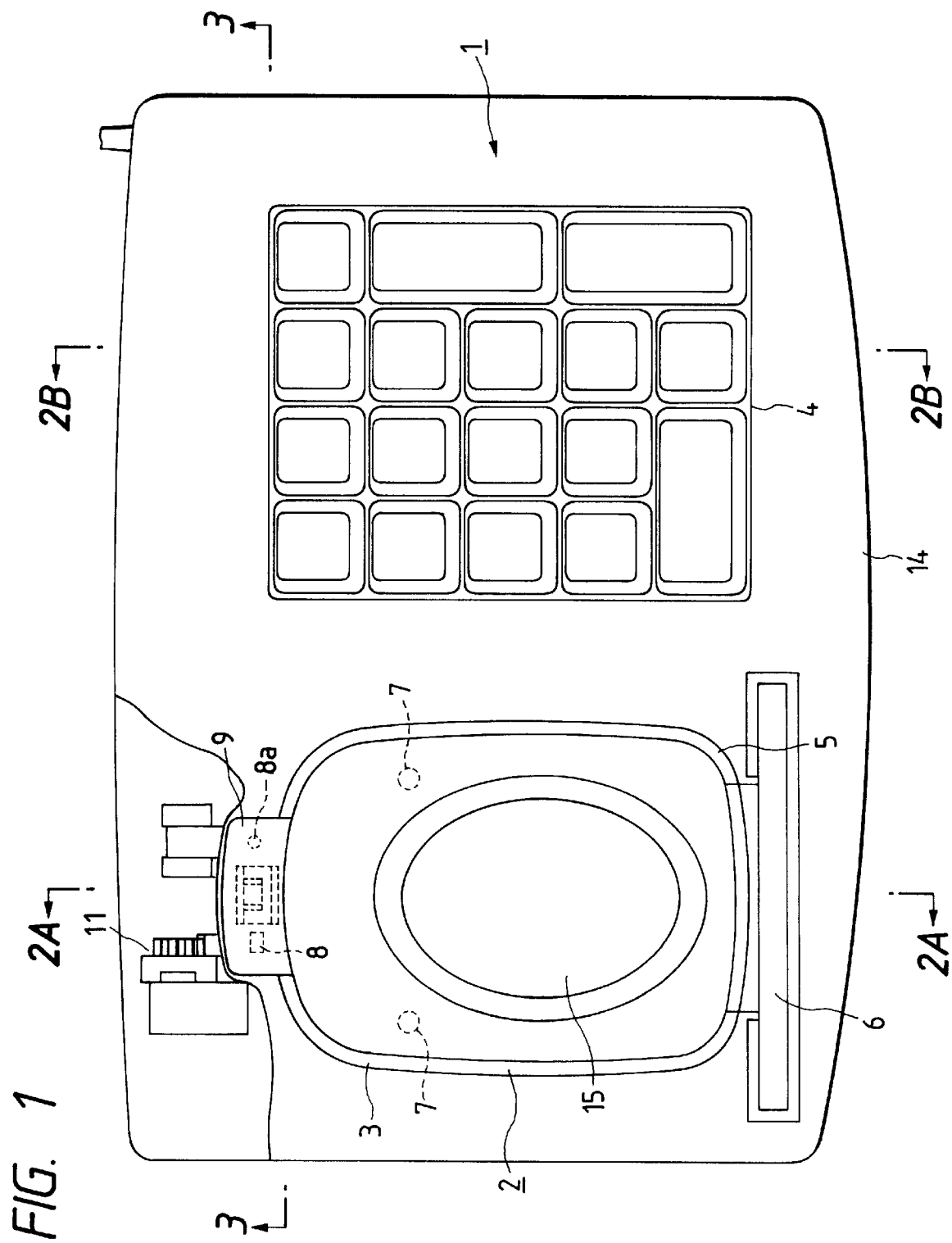
FIG. 1 is a top view showing the constitution of one embodiment of a data input device.

FIG. 1 is a top view showing the constitution of one embodiment of a data input device according to the present invention; FIGS. 2A and 2B are sectional views taken along lines A—A' and B—B' respectively in the embodiment shown in FIG. 1; and FIG. 3 is a sectional view taken along line C—C' in the embodiment shown in FIG. 1.

In this case, either of FIG. 1 and FIG. 2A shows the state that the portable coordinate input apparatus is inserted in the apparatus housing section; and FIG. 3 shows the portable coordinate input apparatus removed from the apparatus housing section.

As shown in FIG. 1, FIGS. 2A and 2B and FIG. 3, the data input device 1 has a casing 14 comprising a generally thin, nearly rectangular bottom plate 14a and a cover body 14b covering the bottom plate 14a, an apparatus housing section 3 in the casing 14 into which a tablet-type portable coordinate input apparatus 2 is inserted, and a key control section 4 having a plurality of keys on the cover body 14b. The apparatus housing section 3 has a movable mounting base 5 inside for mounting the portable coordinate input apparatus 2. The movable mounting base 5 can move up and down between the upper limit position and the lower limit position. A rotating shaft 6 is connected to one of opposite short edge portions and a rack-and-pinion mechanism 11 is engaged with the other short edge portion. Further, a pair of springs (elastic members) 7 are interposed between the bottom section close to the other short edge portion and the bottom plate 14a in the portable mounting base 5. The rack-and-pinion mechanism 11 comprises a rack 12 mounted on the portable mounting base 5 side and a pinion 13 mounted on the casing 14 side. The rack 12 and the pinion 13 are in mesh with each other through teeth. The pinion 13 mounted on the casing 14 side has a vane on the rotating shaft; grease is filled in the rack-and-pinion mechanism 11 where the vane is housed, so that the pinion 13 rotates slowly. A locking member 10 is used, as shown in FIG. 4, for holding the movable mounting base 5 in the lower limit position; a hook section 10a is mounted on the casing 14 side and a lock engaging section 10b on the movable mounting base 5 side. Inside the apparatus housing section 3, a light receiving element 8 and a light emitting diode 8a which indicates the light receiving state of the light receiving element 8 are located in positions close to the other short edge portion of the movable mounting base 5. The area where the light receiving element 8 and the light emitting diode 8a are arranged is covered with a filter cover 9.

Figure 5A:
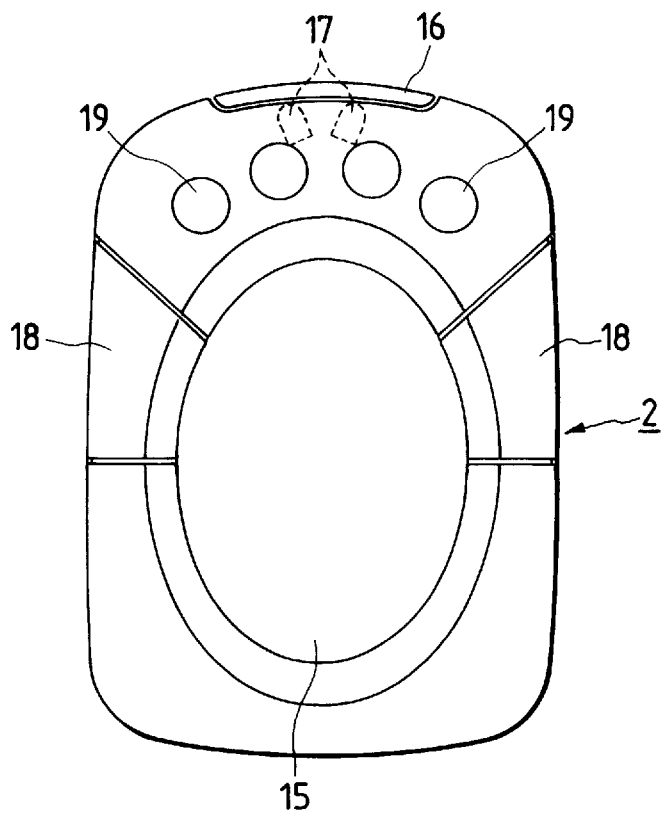
FIGS. 5A and 5B are schematic views showing one example of a portable coordinate input apparatus used in the data input device shown in FIGS. 1 to 3.
Figure 5B:
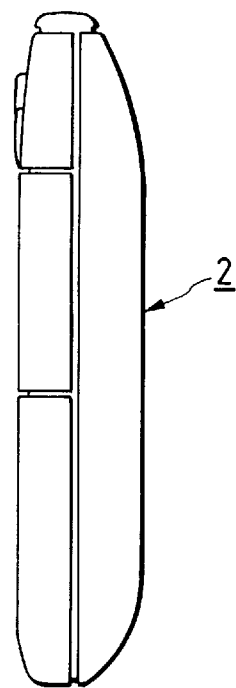

Next, FIG. 4 is a sectional view showing one example of the constitution of the locking member 10 which holds the movable mounting base 5 to be used in the embodiment shown in FIGS. 1 to 3, in the lower limit position; FIG. 5 is a schematic view showing one example of the portable coordinate input apparatus 2 to be used in the embodiments shown in FIGS. 1 to 3; FIG. 5A is a top view thereof; and FIG. 5B is a side view thereof.

As shown in FIG. 4, the locking member 10 is composed of a hook section 10a having an extended forward end area, and a lock engaging section 10b which moves up and down within a predetermined range and is engaged with the extended forward end area of the hook section 10a when in the lower position.

Also as shown in FIG. 5, the portable coordinate input apparatus 2 is of a thin, nearly oval type which can be held by one hand, and has a pair of light emitting elements 17 on the front side and an optical filter 16 for covering the front face of the light emitting element 17 is provided. On the upper surface of the portable coordinate input apparatus, a capacitance variable detecting face 15 is mounted at center. On either side is provided a first switch groups 18 comprising two switches for changing over the data. On the front side, there is provided a second switch group 19 comprising four switches for performing various kinds of display functions such as spotlight function, zooming function, marker or line function, etc. In this case, the capacitance variable detecting face 15 is designed to be operated by fingers, thereby changing the capacitance in the operated area to obtain a positional data corresponding to a control position on the basis of a changed capacitance. The two switches in the first switch group 18 generally have the same function as switches provided on the mouse.

Figure 6:
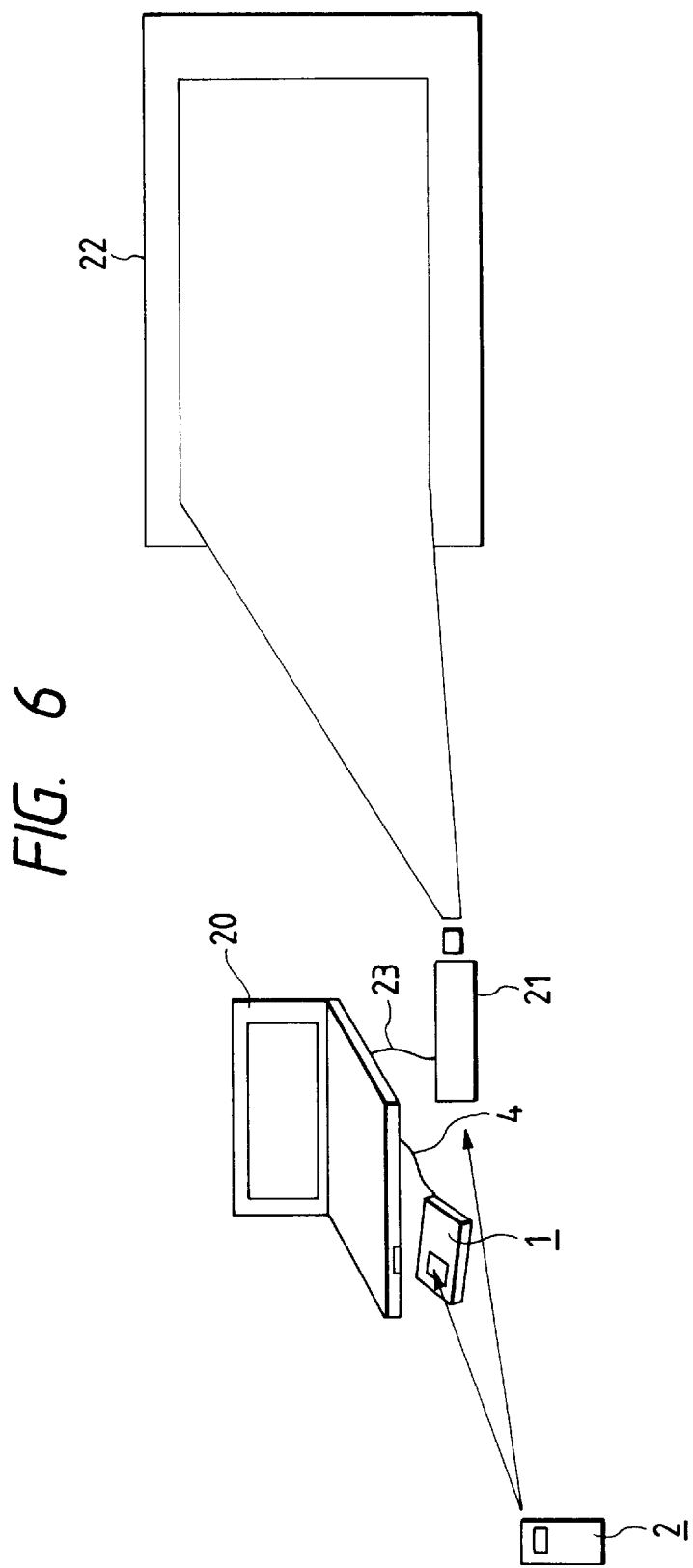
FIG. 6 is a schematic view showing one example used in the presentation of the data input device shown in FIGS. 1 to 3.

Subsequently, FIG. 6 is a schematic diagram showing one example of the data input device 1 in FIGS. 1 to 3 given in the presentation.

As shown in FIG. 6, the data input device 1 is connected by a cable to an image display device 20, which is in turn connected by cable to a projector 21. The light from the projector 21 is projected onto a large screen 22.

Here, operation of the data input device of the present embodiment will be explained with reference to FIGS. 1 to 6.

First, to insert the portable coordinate input apparatus 2 into the apparatus housing section 3 of the data input device 1, the portable coordinate input apparatus 2 is placed on the equipment mounting base 5 within the apparatus housing section 3. At this time, the equipment mounting base 5 is held up in the upper limit position by the elastic force of the spring 7; in this state, one short edge portion side (the rack-and-pinion mechanism 11 side) is higher than the other short edge portion side (the rotating shaft 6 side). Therefore the portable coordinate input apparatus 2 should be mounted on the equipment mounting base 5 in such a manner that the front side (the light emitting element 17 mounting side) of the portable coordinate input apparatus 2 will come on the other short edge portion side of the equipment mounting base 5. Next, when the front part of the portable coordinate input apparatus 2 is pushed down by hand, the other short edge portion in the equipment mounting base 5, with the portable coordinate input apparatus 2 mounted thereon, turns on the center of the rotating shaft 6, going downward against the elastic force of the spring 7 as low as the lower limit position. In this lower limit position the mounting base 5 is engaged with the locking member 10. That is, since the hook 10*a* comes into engagement with the lock 10*b*, the equipment mounting base 5 rises only a little, remaining in the locked state in the lower limit position, if the hand pushing down the portable coordinate input apparatus 2 is released. At this time, the portable coordinate input apparatus 2 is inserted and housed state in the apparatus housing section 3 of the data input device 1, the upper surface of the portable coordinate input apparatus 2 being nearly flush with the key control face of the key control section 4.

With the portable coordinate input apparatus 2 inserted in the apparatus housing section 3 of the data input device 1, when the capacitance variable detecting face 15 is operated by fingers, the capacitance in the operated part varies to thereby detect the coordinate position in the operated part, thus forming a positional data. The positional data is conveyed by the optical signal form the light emitting element 17. On the other hand, when the optical signal is received by the light receiving element 8 on the data input device 1 side located close to the light emitting element 17, the positional data in the optical signal is extracted, being conveyed to the image display device 20. The image display device 20 moves the display position of the cursor on the data on the basis of the positional data thus supplied, and at the same time, the display data including the positional data is transmitted to the projector 21 to thereby move the cursor display position on the large screen 22.

Also, with the portable coordinate input apparatus 2 inserted in the apparatus housing section 3 of the data input device 1, when any switch of the first switch group 18 is operated, a switch data corresponding to the operated switch is formed. This switch data is transmitted by the optical signal from the light emitting element 17. When this optical signal is received by the light receiving element 8 on the data input device 1 side, the switch data in the optical signal is extracted, being sent to the image display device 20. The image display device 20 changes over the data displayed on the display screen, on the basis of the switch data supplied. At the same time, the data including the switch data is sent to the projector 21, from which the data being displayed on the large screen 22 is changed.

Furthermore, when any switch of the second switch group is operated, with the portable coordinate input apparatus 2 inserted in the apparatus housing section 3 of the data input device 1, the same operation is carried out like the operation of any switch of the first switch group, applying spotlight or attaching a marker or a line to a predetermined part of data displayed on the display screen of the image display device 20, and at the same time applying spotlight or attaching a marker or a line to a predetermined part of data displayed on the large screen 22.

Next, when the portable coordinate input apparatus 2 is taken out of the apparatus housing section 3 of the data input device 1, the portable coordinate input apparatus 2 is pressed at the front part down by hand. The portable coordinate input apparatus 2 moves a little downward. At this time, the locking member 10 unlocks, that is, the hook 10*a* is unlocked from the lock 10*b*; therefore the other short edge portion side of the equipment mounting base 5 with the portable coordinate input apparatus 2 mounted thereon is moved upward on the center of the rotating shaft 6 by the elastic force of the spring 7 until it reaches the upper limit position. At this time, the portable coordinate input apparatus 2 comes off from the apparatus housing section 3 of the data input device 1 and the lower surface of the front part in the portable coordinate input apparatus 2 becomes nearly at the same level as the key control face of the key control section 4. The portable coordinate input apparatus 2, therefore, can easily be grasped by one hand.

When the portable coordinate input apparatus 2 is off the apparatus housing section 3 of the date input device 1, that is, when holding the portable coordinate input apparatus 2 by hand in a place apart from the data input device 1, the operator operates the capacitance variable detecting face 15 by the thumb or other fingers, directing the front face of the portable coordinate input apparatus 2 toward the light receiving element 8 of the data input device 1. In this case also, the capacitance in the operated part similarly varies as previously stated, thereby detecting the coordinate position of the operated part to form the positional data. The positional data is transmitted by the optical signal from the light emitting element 17. When this optical signal is received by the light receiving element on the data input device 1 side, the positional data in the optical signal is extracted and transmitted to the image display device 20. The image display device 20 moves the cursor display position on the screen according to the positional data thus supplied and at the same time the display data including the positional data is transmitted to the projector 21, thereby moving the cursor display position displayed on the large screen 22.

When the operator, in a place apart from the data input device 1, operates any one switch of the first switch group 18 while holding the portable coordinate input apparatus 2 with its front face directed toward the light receiving element 8 of the data input device 1, the switch data is formed, similarly to the above-described case, correspondingly to the switch thus operated. This switch data is transmitted by the optical signal from the light emitting element 17. When this optical signal is received by the light receiving element 8 on the data input device 1 side, the switch data in the optical signal is extracted, being transmitted to the image display device 20. The image display device 20 changes over the data displayed on the screen according to the switch data thus supplied, and at the same time the display data including the switch data is transmitted to the projector 21, to thereby change over the data displayed on the large screen 22.

Furthermore, the operator, in a place apart from the data input device 1, operates any switch of the second switch group while holding the portable coordinate input apparatus 2 with its front face directed toward the light receiving element 8 of the data input device 1, to thereby train the spotlight on, and to attach a marker or a line to, the predetermined part of data displayed on the screen of the image display device 20, and at the same time to direct the spotlight on, and attach a marker or a line to, the predetermined part of the data displayed on the large screen 22.

According to the data input device 1 of the present invention, as described above, either when the portable coordinate input apparatus 2 is inserted in the apparatus housing section 3, or when the portable coordinate input apparatus 2 is off the apparatus housing section 3, the coordinate (positional) data and switch data obtained by operating the detecting face 15 and the switch groups 18 and 19 on the portable coordinate input apparatus 2 are transmitted by the optical signal from the light emitting element 17 on the portable coordinate input apparatus 2 side to the light receiving element 8 on the data input device 1 side. When the data input device 1 receives the optical signal, the coordinate (position) data and switch data in the optical signal are supplied to the image display device 20, thus moving the cursor on the display screen of the image display device 20 and changing over the displayed data.

Furthermore, according to the data input device 1 of the present embodiment, when making a presentation using the data input device 1, the speaker gives explanation while holding and operating by one hand the portable coordinate input apparatus 2 removed from the apparatus housing section 3. Also, the speaker, when having the data input device 1 to hand, can explain while operating the portable coordinate input apparatus 2 inserted in the apparatus housing section 3. Therefore, the data input device 1 makes effective operation, immediately and accurately displaying necessary images and moving the cursor immediately and accurately to a point of display required.

Furthermore, according to the data input device 1 of the present embodiment, when the portable coordinate input apparatus 2 is inserted into the apparatus housing section 3, the upper surface of the portable coordinate input apparatus 2 becomes flush with the control face of the key control section 4. Therefore, the detecting face 15 and the switch groups 18 and 19 of the portable coordinate input apparatus 2 can be operated just like operating the key control section 4.

According to the data input device of the present invention, as described above, regardless to whether the portable coordinate input apparatus is inserted in the apparatus housing section or not, the coordinate (position) data and switch data obtained by operating the defecting face and various switches on the portable coordinate input apparatus side are transmitted by the optical signal from the light emitting element on the portable coordinate input apparatus side to the light receiving element on the data input device side. When the data input device receives the optical signal, the coordinate (position) data and the switch data in the optical signal are supplied to the image display device, effectively moving the cursor displayed on the screen of the display section of the image display device and changing over the data on the screen.

Furthermore, according to the data input device of the present invention, the speaker, when using the data input device in a presentation, holds by hand the portable coordinate input apparatus removed from the apparatus housing section, and explains while operating the portable coordinate input apparatus. Also when the speaker has the data input device to hand, the portable coordinate input apparatus is inserted in the apparatus housing section; in this state the speaker can explain while operating the portable coordinate input apparatus. The data input device, therefore, has superior controllability and can immediately and accurately display a necessary image and also immediately and accurately move the cursor to a necessary point of display.

Furthermore, according to the data input device of the present invention, when the portable coordinate input apparatus is inserted and housed in the apparatus housing section, the upper surface of the portable coordinate input apparatus becomes flush with the control face of the key control section, allowing the operation of the detecting face of the portable coordinate input apparatus and each switch group just like the operation of the key control section.

While preferred embodiments of the present invention are shown and described hereinabove, it will be understood that this invention is not to be limited thereto, since many modifications and changes may be made therein, and it is contemplated therefore, by the appended claims, to cover any such modifications as fall within the true spirit and scope of this invention.

What is claimed is:

1. An image control device, comprising:
    a portable coordinate input apparatus comprising a control face and a light emitting element and capable of independent remote operation;
    a data input device comprising a light receiving element for receiving light from said light emitting element and further comprising an apparatus housing section for removably housing said portable coordinate input apparatus and a key control section provided with key switches; and
    a computer apparatus for controlling an image of a projector by data supplied from said data input device;
    said light receiving element receiving coordinate data and switch data for executing multiple functions from said portable coordinate input device and sending said coordinate data and said switch data to said data input apparatus either during remote operation or when said portable coordinate input device is housed in said apparatus housing section.

2. A data input device, comprising:
    an apparatus housing section for removably housing a portable coordinate input apparatus, said apparatus housing section comprising a light emitting element, a key control section comprising a control face and a plurality of keys, and a light receiving element;
    a movable mounting base disposed in said apparatus housing section which is movable between an upper limit position and a lower limit position, so that when said portable coordinate input apparatus is inserted and housed in said apparatus housing section, said movable mounting base is held in said lower limit position, where an entire upper surface of said portable coordinate input apparatus is nearly flush with said control face of said key control section; and, on the other hand, when said portable coordinate input apparatus is removed from said apparatus housing section, said movable mounting base moves up to said upper limit position where said mounting base can be removed from said apparatus housing section.

3. A data input device according to claim 2, wherein said movable mounting base is moved up to said upper limit position by an elastic force generated by an elastic member and said movable mounting base is held in said lower limit position by engagement with an engaging member which overcomes said elastic force generated by said elastic member.

4. A data input device according to claim 2, wherein when said portable coordinate input apparatus is inserted and housed in said apparatus housing section, said light emitting element and said light receiving element are arranged in close vicinity to one another.

5. A data input device according to claim 2, wherein a first edge portion of said movable mounting base is mounted with a rack-and-pinion mechanism and a second edge portion of said movable mounting base is mounted to a rotating shaft, so that when said movable mounting base moves up to said upper limit position and down to said lower limit position, only said first edge portion is moved by said rack-and-pinion mechanism.

6. A data input device according to claim 2, wherein said control face of said portable coordinate input apparatus comprises a capacitance variable position detecting mechanism which is operated by fingers.

7. A data input device according to claim 2, wherein said portable coordinate input apparatus comprises a first switch comprising a display image changeover function and a plurality of second switches for spotlight function, zooming function, and marker or line function.

* * * * *